United States Patent
Vyas et al.

(10) Patent No.: US 8,664,823 B2
(45) Date of Patent: Mar. 4, 2014

(54) MAGNETIC BARRIER FOR MINIMIZING DEMAGNETIZATION IN BI-PERMANENT MAGNET SYNCHRONOUS MACHINES

(75) Inventors: Rajeev Vyas, Rochester Hills, MI (US); Thomas Wolfgang Nehl, Shelby Township, MI (US); Alexandru Rajala, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 114 days.

(21) Appl. No.: 13/483,277

(22) Filed: May 30, 2012

(65) Prior Publication Data
US 2013/0320797 A1    Dec. 5, 2013

(51) Int. Cl.
*H02K 21/12*    (2006.01)

(52) U.S. Cl.
USPC ............................. 310/156.53; 310/156.57

(58) Field of Classification Search
USPC ........................ 310/156.38–156.57
See application file for complete search history.

(56) References Cited

U.S. PATENT DOCUMENTS

| | | | |
|---|---|---|---|
| 4,924,130 A * | 5/1990 | Fratta | 310/156.53 |
| 7,504,754 B2 * | 3/2009 | Jahns et al. | 310/156.53 |
| 2003/0094875 A1 * | 5/2003 | Sakuma et al. | 310/156.56 |
| 2005/0110355 A1 * | 5/2005 | Sakuma et al. | 310/156.53 |
| 2006/0103254 A1 * | 5/2006 | Horst | 310/156.53 |
| 2006/0208593 A1 * | 9/2006 | Park et al. | 310/156.53 |
| 2007/0096578 A1 * | 5/2007 | Jahns et al. | 310/156.53 |
| 2008/0224558 A1 * | 9/2008 | Ionel | 310/156.57 |
| 2009/0140592 A1 * | 6/2009 | Rahman et al. | 310/156.53 |
| 2010/0079026 A1 * | 4/2010 | Han et al. | 310/156.53 |
| 2010/0141076 A1 * | 6/2010 | Blissenbach et al. | 310/156.53 |
| 2010/0237735 A1 * | 9/2010 | Blissenbach et al. | 310/156.53 |

\* cited by examiner

Primary Examiner — Thanh Lam

(57) ABSTRACT

A rotor for a permanent synchronous machine includes a rotor having a plurality of arcuately-shaped cavities formed within a rotor core structure. The plurality of arcuately-shaped cavities substantially concentrically layered with respect to an outer cylindrical wall of the rotor core structure. A plurality of permanent magnets is inserted within the plurality of arcuately-shaped cavities. Each cavity layer retains a permanent magnet of a first magnetic field strength disposed in end sections and a permanent magnet of a second magnetic field strength in a center section of each cavity layer. Each respective cavity includes an air barrier formed between the magnets having different magnetic field strengths. The air barrier generates a reluctance within an air barrier gap for directing a flow of flux generated by each third permanent magnet in a preceding layer in a direction toward each third permanent magnet in a succeeding layer.

20 Claims, 3 Drawing Sheets ns shown in FIG. 1 a section view of a permanent
MAGNETIC BARRIER FOR MINIMIZING DEMAGNETIZATION IN BI-PERMANENT MAGNET SYNCHRONOUS MACHINES

BACKGROUND OF INVENTION

An embodiment relates generally to permanent magnet motors.

A permanent magnet synchronous motor is an AC motor in which rotation rate of the shaft is synchronized with the frequency of the AC supply current. A rotating electric field is generated in the stator and the rotor follows the rotating electrical field of the stator. The rotor rotates in step with the field of the stator at a same rate. The rotor and the stator are said to be in synchronization.

The permanent magnets used in conventional rotors are configured to provide a uniform field strength. Neodymium magnets, also known as rare earth magnets, are often desired due to their strong magnetic field strength which provides enhanced torque in motors. However, using rare earth magnets in a motor is costly and increases the overall price of the motor.

SUMMARY OF INVENTION

An advantage of an embodiment is the reduction in the content and weight of rare earth magnets which reduces the overall cost of the motor. The interior permanent synchronous machine utilizes bi-permanent magnets (i.e., the combination of two or more different types of magnet materials) for reducing the number of rare earth magnets utilized in the rotor. A combination of rare earth magnets and ferrite magnets, or magnets of a same material composition having different magnetic field strengths, is utilized in the rotor in a multilayer manner. A unique magnetic barrier design between magnets of different magnetic field strength increases a reluctance which minimizes the magnetic flux originating from the magnet with the weaker magnetic field from flowing toward the magnet having the stronger magnetic field. As a result, a demagnetization of the weaker magnets is minimized.

An embodiment contemplates a rotor for a permanent magnet synchronous machine. A rotor core structure having a cylindrical body including an outer cylindrical wall of the rotor core structure juxtaposed to a main air gap. A plurality of arcuately-shaped cavities is formed within the rotor core structure. The plurality of arcuately-shaped cavities is substantially concentrically layered with respect to an outer cylindrical wall of the rotor core structure. Each arcuately-shaped cavity extending between first and second end sections is juxtaposed to the outer cylindrical surface wall of the rotor structure and includes an intervening center section. A plurality of permanent magnets is inserted within the plurality of arcuately-shaped cavities. Each first end section retains a respective first permanent magnet having a first magnet field strength. Each second end section retains a respective second permanent magnet having the first magnetic field strength. Each center section retains a respective third permanent magnet having a second magnet field strength less than the first magnetic field strength. The first magnet and the second magnet are spaced from the third magnet. A respective cavity includes an air gap formed between the third permanent magnet and the first and second permanent magnets. Each air gap follows an indentation formed in a wall of each cavity layer extending radially outward at the interfaces between the third permanent magnet and the first and second permanent magnets. The air gap generates a reluctance for directing a flow of flux generated by each third permanent magnet in a preceding layer in a direction toward each third permanent magnet in a succeeding layer.

DETAILED DESCRIPTION

Figure 1:
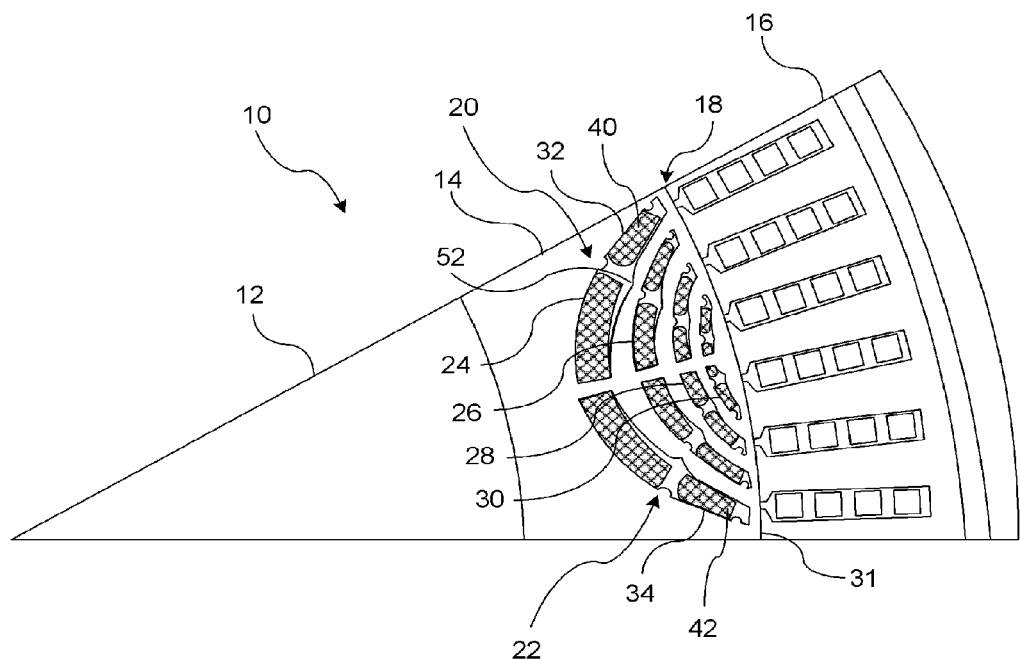
FIG. 1 is a section view of a permanent magnet motor.

There is shown in FIG. 1 a section view of a permanent magnet motor 10. The permanent magnet motor 10 includes a rotor 12 coupled to a shaft 14. The rotor 12 can include any number of poles (e.g. 2, 4, 6, etc). The sectional view as shown illustrates one pole of the rotor 12 (e.g. north pole). A stator 16 is radially offset from the rotor 12 and is separated therefrom by a main air gap 18.

The function of the rotor 12 is to drive a component coupled to the shaft 14. The stator 16 when excited by an excitation voltage (e.g., 3-phase supply) generates a rotating magnetic field within the motor 10. The rotor, which functions as a permanent magnet locks in with the rotating magnetic field generated by the stator 16. The rotor 12 rotates along with the rotating magnetic field. When the rotator locks in with the rotating magnetic field, the motor 10 is in synchronization.

The rotor 12 as shown in FIG. 1 utilizes interior permanent magnets 20. It should be understood that the motor can be any type of permanent magnet motor and does not require interior permanent magnets. The interior permanent magnets 20 are inserted within a plurality of arcuately-shaped cavities 22 formed within the rotor 12. The plurality of arcuately-shaped cavities 22 are structured in a multilayer manner. The plurality of arcuately-shaped cavities 22 includes a first arcuately-shaped cavity 24, a second arcuately-shaped cavity 26, a third arcuately-shaped cavity 28, and a fourth arcuately-shaped cavity 30. Each of the arcuately-shaped cavities is substantially concentrically layered with respect to an outer cylinder wall 31 of the rotor 12.

Each arcuately-shaped cavity includes a first end section 32 and second end section 34 that are juxtaposed to the outer cylindrical surface wall 31 of the rotor 12. Each arcuately-shaped cavity includes an intervening center section 36 extending between the first end section 32 and the second end section 34.

The interior permanent magnets 20 include a first magnet 40 disposed within a first end section 32 of each cavity layer generating a magnetic field having a first magnet field strength, and a second magnet 42 disposed within the second end section 34 of each cavity layer having the first magnetic field strength. A third magnet 44 is disposed between the first magnet 40 and the second magnet 42 of each cavity layer. The third magnet 44 generates a magnetic field having second magnetic field strength. The first magnetic field strength generated by the first and second magnet 40, 42 is greater than the second magnetic field strength generated by the third magnet 44. The third magnet 44 may include a single curved magnet conforming to the shape of a respective cavity, or the third magnet 44 may include more than one permanent magnet inserted within a respective cavity layer. The number of third magnets 44 utilized within a respective cavity layer may be based on the ease of assembling the third magnets into the respective cavity. That is, due to the curvature of the cavity, it may be more efficient and practical to utilize smaller magnets for ease of assembly.

The first and second magnets 40, 42 may be a different material composition than the third magnet 44 or may be of a same material composition, but have different magnetic field strengths. For example, the first magnet 40 and second magnet 42 may be a rare earth magnet (e.g., neodymium magnet) and the third magnet 44 may be a ferrite magnet. Alternatively, the first magnet 40, second magnet 42, and the third magnet 44 may all be ferrite magnets or all rare earth magnets where the first and second magnets 40, 42 have a stronger magnetic field than the third magnet 44. The overall cost of the magnets is reduced by requiring less of the higher magnetic field strength materials. However, unless the relative placement of the different materials is properly configured, the resultant magnetic field may not be effective at operating the motor.

An issue in utilizing bi-permanent magnets is the demagnetization of the magnet generating the weaker magnetic field, by the stronger one. If the magnets are not properly positioned between the respective cavity layers, the flux flow generated by the ferrite magnets will be demagnetized by the adjacent rare earth magnets. As a result, the motor loses torque and efficiency.

Figure 2:
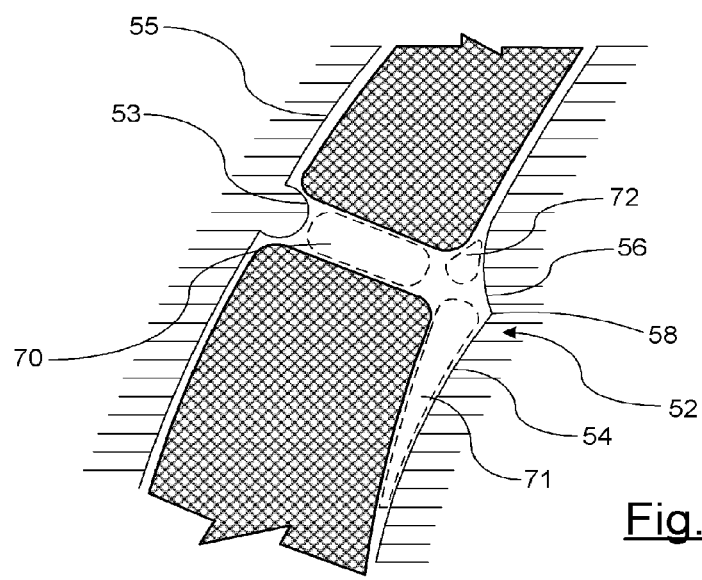
FIG. 2 is an enlarged section view of the rotor illustrating the air gaps formed within a respective cavity.

To avoid demagnetization of the ferrite magnets, the rare earth magnets are positioned so that the rare magnets in a succeeding cavity gradually overlap the ferrite magnets of a preceding cavity. As shown in FIG. 2, the first cavity layer 24, a second cavity layer 26, a third cavity layer 28, and a fourth cavity later 30 each contains rare earth magnets 40, 42 in the first and second end sections 32, 34 and ferrite magnets the center intervening section 36. The rare earth magnets 40, 42 in the second cavity layer 26 angularly overlap the ferrite magnet 44 in the first cavity layer 40. Similarly, the rare earth magnets 40, 42 of the third cavity layer 28 angularly overlap the ferrite magnet 44 of the second cavity layer 26. The length of the angular overlap between the second/third cavity layers in contrast to the first/second cavity layers gradually increases. Moreover, the rare earth magnets 40, 42 of the fourth cavity layer 30 angularly overlap the ferrite magnet 44 of the third cavity layer 28. The length of the angular overlap between the third/fourth cavity layers in contrast to the second/third cavity layers gradually increases. As a result, a progressive gradual angular overlapping of a ferrite magnet of a preceding cavity layer and rare earth magnet of a succeeding cavity layer is designed for each of the cavity layers.

The positioning for achieving the length of the angular overlap between respective magnets of each cavity layer is based on optimizing a flow of flux generated by the both the rare earth magnets and the ferrite magnets. The positioning of the rare earth magnets of a respective succeeding cavity layer to the rare earth magnets of a succeeding cavity layer is identified when the flow of flux collectively generated by the rare earth magnets is directed perpendicular to the rare earth magnets and into the main air gap 18.

The positioning of the rare earth magnets of a respective succeeding cavity layer relative to the ferrite magnets of a preceding cavity layer is also collectively utilized when positioning the respective magnets. The optimal length of overlap between the respective magnets of each cavity layer is identified when the demagnetization of the magnetic field of the ferrite magnets is minimized. Identifying the length of overlap of the magnets between the respective cavity layers is accomplished by determining magnet positions that provides the minimal demagnetization of the ferrite magnets. The configuration of FIG. 1 in utilizing a gradual and progressive overlap of the magnets between the respective cavity layers generates an enhanced torque for the motor. As a result, cost associated with utilizing a same magnet within the rotor, such as rare earth magnets may be reduced, by utilizing two sets of magnets having different magnetic field strengths in the configuration as described herein.

To further enhance a reduction in the demagnetization of the weaker magnets, various air gaps are provided in each cavity around the rare earth magnet 40 and the ferrite magnet 44. It should also be noted that similar air gaps will be provided at the interface between the second earth magnet 42 and the ferrite magnet 44 of each cavity layer.

FIG. 2 illustrates an enlarged section view of the rotor illustrating the air gaps formed within a respective cavity. A locator 53 is formed in an inner wall 55 of each cavity layer for positioning each permanent magnet therein with a predetermined spacing between adjacent magnets. An outer slot edge 52 is sloped to form an indentation in a wall of each cavity layer extending radially outward in a direction toward the starter 16. The resulting gaps 70, 71, 72 creates a reluctance that directs a flow of flux generated by the rare earth and ferrite magnets toward the main air gap 18 juxtaposed to the outer cylindrical wall.

The indentation includes a first sloped surface 54 and a second sloped surface 56 that intersect at a peak 58. The first sloped surface 54 and the second sloped surface 56 have opposing slopes that can be symmetrical or non-symmetrical. Each sloping surface is less than 90 degrees. The first sloped surface 54 extends in a direction from the peak 58 to the third permanent magnet 44, whereas the second sloped surface 56 extends in a direction from the peak 58 to the first permanent magnet 40. As shown, the slope of the first sloped surface 54 is less than the slope of the second sloped surface 56. Alternatively, the second sloped surface 56 may be less than the first sloped surface 54. It should be understood that the indentation between the second permanent magnet 42 (shown in FIG. 1) and the third permanent magnet 44 includes similar configurations as described above, such that the first sloped surface 54 extends in a direction from the peak 58 to the third permanent magnet 44, whereas the second sloped surface 56 extends in a direction from the peak 58 to the second permanent magnet 42, or vice versa.

The first sloped surface 54 and the second sloped surface 56 create air gaps 71 and 72, respectively, between the outer slot edge 52 and each respective magnet. Air gap 71 and 72 increases the reluctance of the flow of flux of the magnetic field. That is, a magnetic field will cause flux to flow to a path of least magnetic resistance. By increasing the reluctance, much of the magnetic field generated by each magnet is diverted from flowing toward this space. As a result, the air gaps 70-72 reduce the flux flow of the magnetic field generated by each respective magnet flowing to an adjacent magnet.

Figure 3:
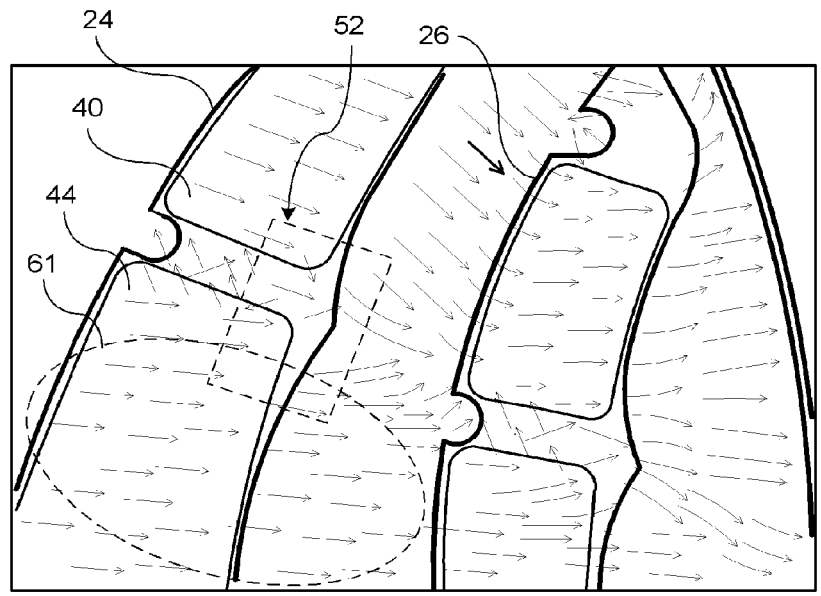
FIG. 3 is an enhanced view of the flux flow of the permanent magnet motor utilizing a magnetic barrier feature.
Figure 4:
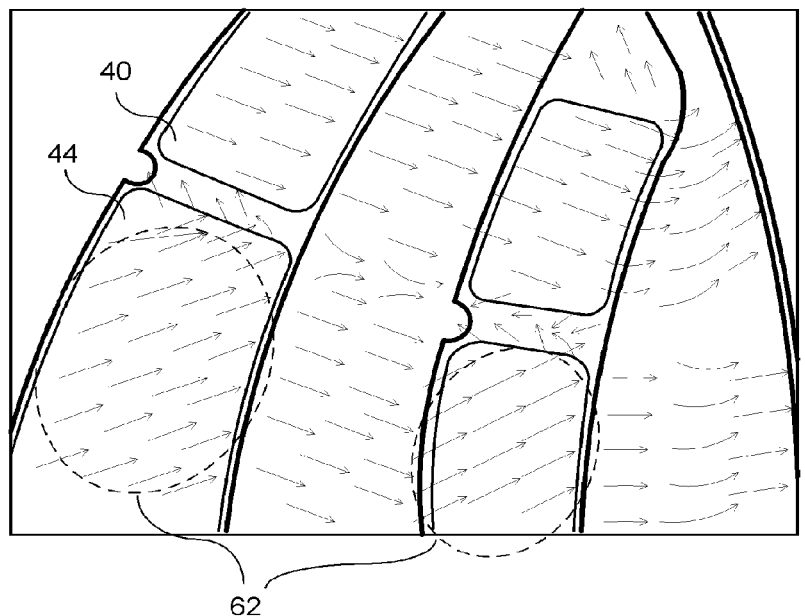
FIG. 4 is an enhanced view of the flux flow of the permanent magnet motor without the magnetic barrier feature.

FIG. 3 illustrates the flux flow for the bi-permanent magnets of the motor when utilizing air gaps generated by the outer slot edge 52. As illustrated in FIG. 3, the flux flow is directed away from the air gaps 71 and 72. Instead of the flux generated by the ferrite magnet 44 flowing substantially in a direction toward the rare earth magnet 42 (as shown in FIG. 4), much of the flux flow generated by the ferrite magnet of the first cavity layer 24 is diverted to the ferrite magnet of second cavity layer 26 as illustrated generally by 61. As a result, demagnetization is further reduced.

FIG. 4 illustrates a rotor not incorporating the air gaps generated by the outer slot edge. The magnetic flow from the ferrite magnet 44 tends to flow in a direction toward the rare earth magnet 42 in each cavity layer as a result of the magnetic field generated by the rare earth magnet 42. This is illustrated generally by 62 in FIG. 4. The result is demagnetization of the ferrite magnets which reduces the torque output of the motor.

Referring again to FIG. 2, the length of each sloping surface and the resulting volume of the air gaps 71 and 72 are based the amount of reluctance required for a respective magnet. For example, more reluctance may be desired relative to the ferrite magnet 44 to prevent the flow of flux generated by the ferrite magnet 44 from flowing toward the rare earth magnet 42. As shown in FIG. 2, the first sloped surface 54 extends from the peak to substantially a midway position of the third permanent magnet 44. The midway point is defined as a point or region centrally located between arcuate ends of the third permanent magnet 44. As a result, a longer slope or steeper slope is desired to generate a larger air gap for the ferrite magnet 44 than for the rare earth magnet 40. This creates increased reluctance in the direction of the rare earth magnet 40. As described earlier, the magnetic flux flows to a path of least reluctance. Therefore, the path of least reluctance for the flux generated by the ferrite magnet of the first cavity layer 24 is away from the air gap and toward the ferrite magnet of the second cavity layer 26.

Figures 5, 6:
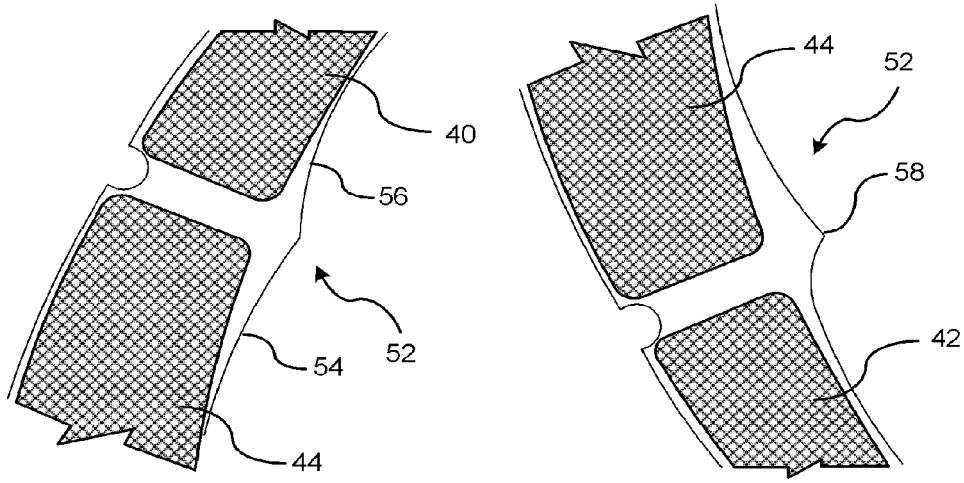
FIG. 5 is an enhanced view of an alternative outer edge slot configuration.
FIG. 6 is an enhanced view of an alternative outer edge slot configuration.
Figures 7, 8:
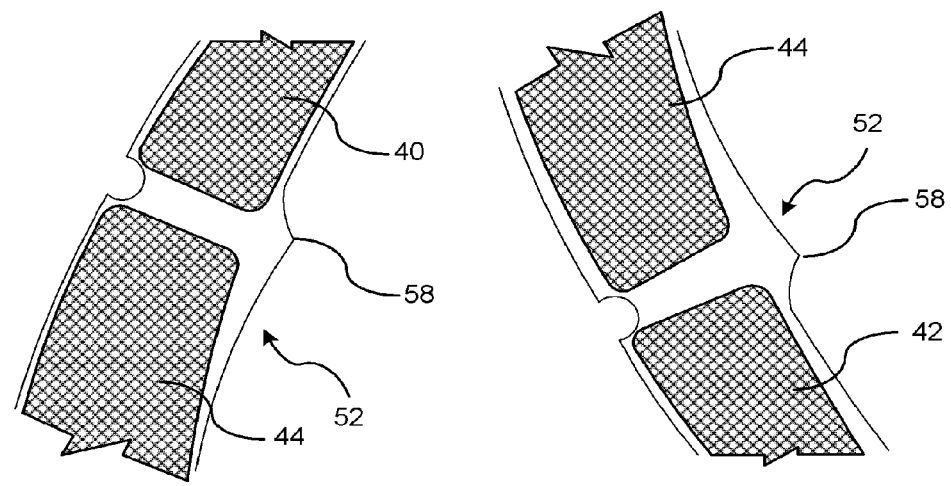
FIG. 7 is an enhanced view of an alternative outer edge slot configuration.
FIG. 8 is an enhanced view of an alternative outer edge slot configuration.

FIGS. 5-8 illustrate various configurations of the outer slot edge 52. FIG. 5 illustrates symmetrical sloped surface 54 and 56. The peak 58 of the indentation is positioned centrally between the first permanent magnet 40 and the third permanent magnet 44. FIG. 6 illustrates a configuration where the third permanent magnet 44 is positioned closer to the peak 58 of the indentation in comparison to the second permanent magnet 42. FIG. 7 illustrates a configuration where the third permanent magnet 44 is positioned further from the peak 58 of the indentation in comparison to the first permanent magnet 40. FIG. 8 illustrates a configuration where the third permanent magnet 44 is positioned further from the peak 58 of the indentation in comparison to the second permanent magnet 42.

While certain embodiments of the present invention have been described in detail, those familiar with the art to which this invention relates will recognize various alternative designs and embodiments for practicing the invention as defined by the following claims.

What is claimed is:

1. A rotor for a permanent magnet synchronous machine comprising:
   a rotor core structure having a cylindrical body, the cylindrical body including an outer cylindrical wall of the rotor core structure juxtaposed to a main air gap;
   a plurality of arcuately-shaped cavities formed within the rotor core structure, the plurality of arcuately-shaped cavities substantially concentrically layered with respect to an outer cylindrical wall of the rotor core structure, each arcuately-shaped cavity extending between first and second end sections is juxtaposed to the outer cylindrical surface wall of the rotor structure and includes an intervening center section; and
   a plurality of permanent magnets inserted within the plurality of arcuately-shaped cavities wherein each first end section retains a respective first permanent magnet having a first magnet field strength, wherein each second end section retains a respective second permanent magnet having the first magnetic field strength, wherein each center section retains a respective third permanent magnet having a second magnet field strength less than the first magnetic field strength, wherein the first magnet and the second magnet are spaced from the third magnet;
   wherein a respective cavity includes an air gap formed between the third permanent magnet and the first and second permanent magnets, wherein each air gap follows an indentation formed in a wall of each cavity layer extending radially outward at the interfaces between the third permanent magnet and the first and second permanent magnets, and wherein the air gap generates a reluctance for directing a flow of flux generated by each third permanent magnet in a preceding layer in a direction toward each third permanent magnet in a succeeding layer.

2. The rotor of claim 1 wherein the indentation of the air barrier includes two opposing sloping surfaces intersecting at a peak.

3. The rotor of claim 2 wherein the two opposing sloping surfaces are non-symmetrical.

4. The rotor of claim 2 wherein the two opposing sloping surfaces are symmetrical.

5. The rotor of claim 2 wherein the third permanent magnet is positioned closer to the peak of the indentation in comparison to the first permanent magnet.

6. The rotor of claim 2 wherein the third permanent magnet is positioned closer to the peak of the indentation in comparison to the second permanent magnet.

7. The rotor of claim 2 wherein the third permanent magnet is positioned further from the peak of the indentation in comparison to the first permanent magnet.

8. The rotor of claim 2 wherein the third permanent magnet is positioned further from the peak of the indentation in comparison to the second permanent magnet.

9. The rotor of claim 2 wherein the third permanent magnet is positioned a same distance from the peak of the indentation in comparison to the first and second permanent magnet.

10. The rotor of claim 1 wherein a first sloping surface of the indentation extends from the peak to substantially a midway position of the third permanent magnet, the midway position being a point centrally located between arcuate ends of the third permanent magnet.

11. The rotor of claim 1 wherein a first sloping surface of the indentation extends in a direction from the peak to the third permanent magnet, and wherein a second sloping surface extends in a direction from the peak to the first permanent magnet, wherein a slope of the first sloping surface is less than a slope of the second sloping surface.

12. The rotor of claim 1 wherein a first sloping surface of the indentation extends in a direction from the peak to the third permanent magnet, and wherein a second sloping surface extends in a direction from the peak to the second permanent magnet, wherein a slope of the first sloping surface is less than a slope of the second sloping surface.

13. The rotor of claim 1 wherein the first permanent magnet in a succeeding arcuately-shaped cavity layer angularly overlaps the first permanent magnet in a preceding arcuately-shaped cavity layer, wherein a length of the angular overlap between the first permanent magnets of the preceding cavity arcuately-shaped cavity layer and a succeeding arcuately-shaped cavity layer is determined based on optimizing of a flow of flux generated by the first permanent magnets toward the outer cylindrical surface wall.

14. The rotor of claim 13 wherein the second permanent magnet in the succeeding arcuately-shaped cavity layer angularly overlaps the second permanent magnet in the preceding arcuately-shaped cavity layer, wherein a length of the angular overlap between the second permanent magnets of the preceding cavity arcuately-shaped cavity layer and a succeeding arcuately-shaped cavity layer is determined based on optimizing of a flow of flux generated by the second permanent magnets toward the outer cylindrical surface wall.

15. The rotor of claim 14 wherein the first permanent magnets disposed in the respective succeeding arcuately-shaped angularly overlaps the third permanent magnet in a preceding arcuately-shaped cavity layer, wherein a length of the angular overlap between the first permanent magnets of the succeeding cavity arcuately-shaped cavity layer and the third permanent magnet of the preceding arcuately-shaped cavity layer is determined based on minimizing a reduction in a demagnification of the second permanent magnets.

16. The rotor of claim 15 wherein the second permanent magnets disposed in the respective succeeding arcuately-shaped cavity layer angularly overlaps the third permanent magnet in a preceding arcuately-shaped cavity layer, wherein a length of the angular overlap between the second permanent magnets of the succeeding arcuately-shaped cavity layer and the third permanent magnet of the preceding arcuately-shaped cavity layer is determined based on minimizing a reduction in a demagnetization of the second permanent magnets.

17. The rotor of claim 1 wherein the first and second permanent magnets are rare earth magnets and the third permanent magnets are ferrite magnets.

18. The rotor of claim 1 wherein the first, second, and third permanent magnets are rare earth magnets.

19. The rotor of claim 1 wherein the first, second, and third permanent magnets are ferrite magnets.

20. The rotor of claim 1 wherein at least two third permanent magnets are disposed within each arcuate-shaped cavity layer.

* * * * *